Jan. 19, 1960　　　　O. J. CUMMINS　　　2,921,871
METHOD OF INCREASING ELECTRICAL RESISTANCE
OF GAS PLATED NICKEL COATINGS
AND RESULTING ARTICLE
Filed May 22, 1957

INVENTOR.
ORVAL J. CUMMINS

BY
*Toulmin & Toulmin*

ATTORNEYS

United States Patent Office 2,921,871
Patented Jan. 19, 1960

2,921,871

METHOD OF INCREASING ELECTRICAL RESISTANCE OF GAS PLATED NICKEL COATINGS AND RESULTING ARTICLE

Orval J. Cummins, Miamisburg, Ohio, assignor, by mesne assignments, to Union Carbide Corporation, New York, N.Y., a corporation of New York Application May 22, 1957, Serial No. 660,883

10 Claims. (Cl. 117—227)

This invention relates to the production of coatings having a relatively high electrical resistance and which resistance varies uniformly and linearly over the length of the coating.

The invention particularly contemplates the provision of an electrical resistance element which is adapted for use in potentiometers and the provision of a method for producing such elements. More specifically the invention contemplates the provision of nickel-containing coatings on substrates which are insulated electrically from the coating.

Nickel carbonyl has hitherto been employed to deposit nickel coatings on electrical conductive materials as well as electrical non-conductive materials. It has now been found the addition of ammonia gas to the nickel carbonyl plating gas results in the production of nickel-containing films of relatively high electrical resistance. While the invention is not to be limited thereby, as a theory, it is believed that in the thermal decomposition of the nickel carbonyl to effect the metallic deposit the carbonyl not only reacts with anhydrous ammonia but in addition the rate of decomposition of the carbonyl is inhibited by the ammonia. This permits a uniform coating to be more readily attained and results in a uniformity of resistance over the length of the element.

In general the conductivity varies with the concentration of anhydrous ammonia and a concentration by volume of about 4–8% in the plating gas has been found to be most useful for the production of good electrical resistance elements. As the concentration decreases below about 4% the conductivity approaches that of pure nickel; as the concentration exceeds this range the character of the deposit changes from a light gray adherent conductive plating to a bluish-black, brittle, low conductivity and poorly adherent coating.

The invention will be more fully understood by reference to the following detailed description and accompanying drawing wherein.

Figure 1:
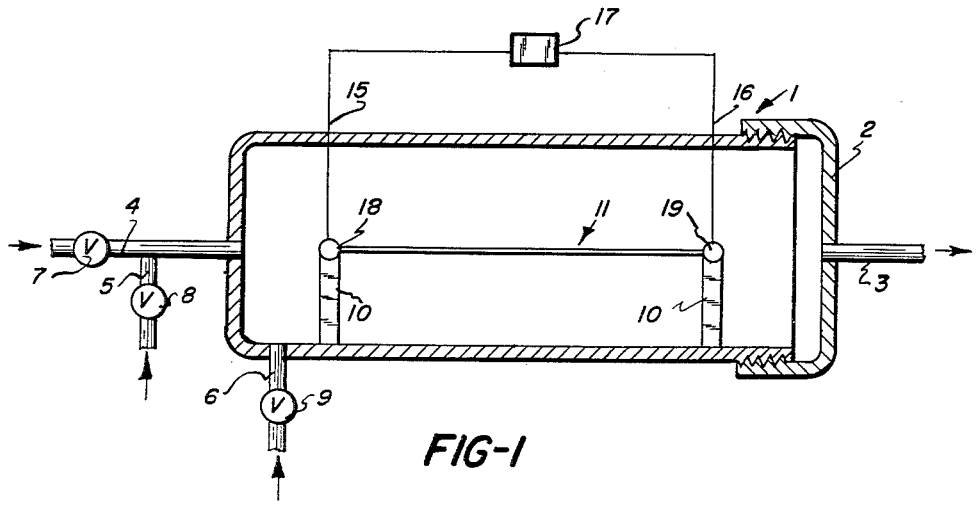
Figure 1 is a schematic view of an apparatus arrangement useful in the practice of the invention.

Referring to the drawings the numeral 1 designates a simplified plating chamber of about 500 cubic centimeter capacity and which is essentially a glass vessel having a closing cap 2. This cap suitably threads to the vessel and is provided with a nipple 3 to which an exhaust line may be connected. At the opposite end the vessel is provided with an inlet line 4 for the nickel carbonyl, a conduit 5 for a carrier gas, such as argon, and a conduit 6 for anhydrous ammonia. Line 4 is suitably valved at 7 and conduits 5 and 6 are provided with valves 8 and 9 respectively. The carrier gas may be utilized as desired in the practice of the invention and is not required.

Figure 2:
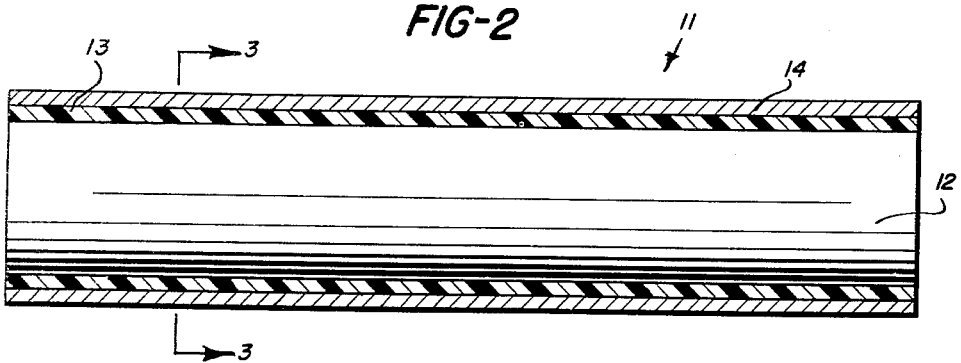
Figure 2 is a greatly enlarged sectional view of a resistance element formed in accordance with the principles of the invention.
Figure 3:
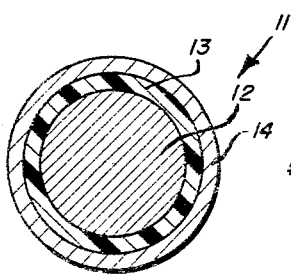
Figure 3 is a sectional view taken on line 3—3 of Figure 2.

Internally of vessel 1 a pair of suitable supports 10, preferably of electrically insulating material such as glass, are provided for a longitudinally extending wire 11 more clearly shown in Figures 2 and 3. The wire 11 comprises a core 12 of copper and a sheath 13 of electrically insulating material such as resin. The wire diameter including the sheath and core is about $\frac{1}{16}$ of an inch.

A pair of leads 15, 16 pass from a source of voltage 17 through the vessel and terminate respectively in electrodes 18, 19. The electrodes 18, 19 respectively clamp against opposed ends of wire 11 and thus provision is made for the passage of current through the wire and the heating of the assembly 12, 13 to above the decomposition temperature of nickel carbonyl. Prior to each plating operation the vessel 1 was swept clear of air and other gases by drawing argon through the vessel.

*Example I*

With a cleaned resin-insulated, flexible wire length of about 50 inches at a temperature of about 165° F. on the wire and with the vessel evacuated of air the plating gas was flowed through the vessel for five minutes. This gas contained nickel carbonyl flowing at a rate of about 283 cc. (standard conditions) per minute and anhydrous ammonia at a rate of about 15 cc. per minute; thus the concentration was about 5% by volume of dry ammonia. The plating vessel is preferably continuously pumped during this plating operation in order to maintain the interior free from foreign substances. A high electrical resistance film or deposit as at 14 in Figures 2 and 3 resulted. This film was hard, somewhat brittle and exhibited a resistance of about 550 ohms per inch of length. However the wire with the ammoniated nickel on the insulating sheath of resin could be flexed without destruction of the film.

*Example II*

By increasing the plating time to 10 minutes and the concentration of ammonia to about 8% by volume, a smooth coating, dark gray in color was obtained which exhibited a resistance of about 715 ohms per inch. The thickness of this coating, obtained by measuring the wire before and after plating indicated the plating thickness to be 0.4 of a mil.

Temperatures as high as 140° C. of the wire or substrate 11 are employable; however, the deposition rate increases with temperature and tends to lead to non-uniformity.

Resistances of up to about 720 ohms per inch have been obtained. The resistance obtainable is controlled by limiting the thickness of the conductive deposit and the concentration of the ammonia. The thickness itself may be limited by the time of plating, the temperature of the substrate or the concentration of the nickel carbonyl by employing a diluting gas such as argon.

It is to be noted that nickel freshly deposited from the gaseous state tends to be chemically active and as a theory this active nickel apparently has an affinity for the ammonia; this occasions reactions within the plating chamber which are dependent particularly upon the percentage of ammonia present in the vapor resulting in relatively high ohmic resistances in thin films, that is less than about 1 mil in thickness. Films of about 0.1 mil in thickness generally exhibit satisfactory uniformity for use as electrical resistances and other conditions being equal are characterized by very high electrical resistances. In fact ohmic resistances of about 40 megohms over a 50 inch length have been obtained in the higher useful ranges of ammonia concentration at low deposit thicknesses. The coatings which exhibit these very high resistances tend to be blue-black in color in contrast to the light gray coatings which exhibit resistances of about 600–700 ohms per inch.

While films of about 0.1 mil to 1 mil thickness are useful and are of particularly good resistance per unit length when applied to small diameter cores, such as the insulated wires of up to about 1/8", it has been found generally desirable to utilize coatings of 0.5 mil to 1 mil in diameter in order to assure completely continuous films and for achieving good ohmic linearity in the product.

In general the temperature of the insulating material undergoing plating is preferably between 110° and 140° C.; lower temperatures are employable but deposition is relatively slow while above 140° C. the deposition rate is high and not conducive to the deposition of very thin films.

The ammoniated nickel films in thickness of about 0.1 to 1 mil do not noticeably reduce the flexibility of the original core on which the film is deposited and such films do not crack upon flexing of the coated core. The core itself need not be flexible but small wire suitably sheathed in a thin electrically non-conductive film of resin such as Formvar have been found most useful and such are readily obtainable at small diameters.

It will be understood that this invention is susceptible to modification in order to adapt it to different usages and conditions and accordingly it is desired to comprehend such modifications within this invention as may fall within the scope of the appended claims.

I claim:

1. In a method of preparing electrical resistance units comprising the step of depositing a thin nickel coating on electrical insulating material, the improvement which comprises depositing the nickel forming the conductive element of the unit from a heat-decomposable gaseous compound contained in an atmosphere which comprises 4 to 8 percent by volume of ammonia gas.

2. The method of preparing electrical resistance units which comprises passing a plating gas containing nickel carbonyl over electrical insulating material maintained at a temperature sufficiently high to decompose the carbonyl, and introducing with the carbonyl ammonia gas from about 4 to 8 percent by volume of the plating gas, maintaining the plating gas flow for a time to occasion the deposit of a film of electrically conductive material of a thickness of at least 0.1 mil, and thereafter removing the unit from the plating gas.

3. The method of plating insulating material to provide the material with a conductive coating of high ohmic resistance per unit length which comprises heating the insulating material to be plated to a temperature sufficiently high to decompose nickel carbonyl, passing said carbonyl along with ammonia to the extent of between about 4 to 8 percent by volume over the material to be plated while it is maintained at said decomposition temperature to thereby deposit on the insulating material an electrically conductive film of high ohmic resistance.

4. The method of plating insulating material to provide the material with a conductive coating of high ohmic resistance per unit length which comprises heating the insulating material to be plated to a temperature in the range of about 110–140° C., passing nickel carbonyl along with ammonia to the extent of about 4 to 8 percent by volume over the material to be plated while it is maintained at said temperature to thereby deposit on the insulating material an electrically conductive film, and continuing the plating until the film thickness is in the range of between about 0.1 to 1 mil.

5. The method of plating insulating material to provide the material with a conductive coating of high ohmic resistance per unit length which comprises heating the insulating material to be plated to a temperature sufficiently high to decompose nickel carbonyl, passing said nickel carbonyl along with argon and with ammonia to the extent of about 4 to 8 percent by volume over the material to be plated while it is maintained at such decomposition temperature to thereby deposit on the insulating material an electrically conductive film, and continuing the deposition to attain a film thickness range of between about 0.1 mil to 1 mil.

6. The method of plating insulating material to provide the material with a conductive coating of high ohmic resistance per unit length which comprises heating the insulating material to be plated to a temperature in the range of about 110° C. to 140° C., passing nickel carbonyl along with argon and with ammonia to the extent of between about 4 to 8 percent by volume over the material to be plated while the material is maintained at such temperature to thereby deposit on the insulating material an electrically conductive film, and continuing the deposition until a film thickness of between about 0.1 mil to 1 mil is attained.

7. An electrical resistance unit of substantially uniformly linear ohmic characteristics comprising a base of insulating material and an ammoniated nickel film coating the insulating material, said film having an electrical resistance per inch of length of between about 550 ohms and 40 megohms.

8. An electrical resistance unit of substantially uniformly linear ohmic characteristics comprising a core in the form of a strand having an outer surface of insulating material and an ammoniated nickel film of a thickness of between about 0.1 mil to 1 mil on the insulating material covering the same, said film having an electrical resistance per inch of length of between about 550 ohms and 40 megohms.

9. An electrical resistance unit of substantially uniformly linear ohmic characteristics comprising a flexible core having an outer sheath of insulating material, and an ammoniated nickel film of a thickness of between about 0.1 mil to 1 mil on the sheath and flexible with the core, said film having an electrical resistance per inch of length of between about 550 ohms and 40 megohms.

10. An electrical resistance unit of substantially uniformly linear ohmic characteristics comprising a flexible core in the form of an electrically conductive wire having a sheath of electrical insulating material thereon, and an ammoniated nickel film of a thickness of between about 0.1 mil to 1 mil on the sheath and insulated thereby from the core, said film being flexible with the core without cracking of the film, said film having an electrical resistance per inch of length of between about 550 ohms and 40 megohms.

References Cited in the file of this patent

UNITED STATES PATENTS

| | | |
|---|---|---|
| 448,915 | Erlwein | Mar. 24, 1891 |
| 1,891,235 | Lawton et al. | Dec. 20, 1932 |
| 2,785,651 | Pawlyk | Mar. 19, 1957 |
| 2,859,132 | Novak et al. | Nov. 4, 1958 |